United States Patent
Chandrasekaran et al.

(10) Patent No.: US 10,767,062 B2
(45) Date of Patent: Sep. 8, 2020

(54) SYSTEM AND METHOD FOR FORMING ACTIVATED CARBON AEROGELS AND PERFORMING 3D PRINTING

(71) Applicant: Lawrence Livermore National Security, LLC, Livermore, CA (US)

(72) Inventors: Swetha Chandrasekaran, Livermore, CA (US); Theodore F. Baumann, Livermore, CA (US); Marcus A. Worsley, Livermore, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 0 days.

(21) Appl. No.: 15/613,630

(22) Filed: Jun. 5, 2017

(65) Prior Publication Data
US 2018/0345598 A1 Dec. 6, 2018

(51) Int. Cl.
*C09D 11/103* (2014.01)
*B33Y 70/00* (2020.01)
(Continued)

(52) U.S. Cl.
CPC ............ *C09D 11/103* (2013.01); *B33Y 70/00* (2014.12); *C09D 11/03* (2013.01); *B29C 64/106* (2017.08);
(Continued)

(58) Field of Classification Search
CPC ... H01B 1/14; H01B 1/16; H01B 1/20; H01B 1/24; H01B 1/04; C09D 11/03; C09D 11/033; C09D 11/10; C09D 11/102; C09D 11/103; C09D 11/38; C09D 11/52; C09D 7/43; C09D 7/44; C09D 7/63; C09D 161/04; C09D 161/06; C09D 161/12;
(Continued)

(56) References Cited

U.S. PATENT DOCUMENTS

| 8,993,113 | B2 * | 3/2015 | Pauzauskie | B82Y 30/00 |
|---|---|---|---|---|
| | | | | 423/448 |
| 2007/0259979 | A1 * | 11/2007 | Lee | C08G 18/5024 |
| | | | | 521/64 |

(Continued)

FOREIGN PATENT DOCUMENTS

CN 106543687 A 3/2017

OTHER PUBLICATIONS

Baumann, Theodore F., et al.: "High surface area carbon aerogel monoliths with hierarchical porosity," Journal of Non-Crystalline Solids, 354, 2008, pp. 3513-3515.
(Continued)

*Primary Examiner* — Matthew R Diaz
(74) *Attorney, Agent, or Firm* — Harness, Dickey & Pierce, P.L.C.

(57) ABSTRACT

Making a carbon aerogel involves 3-D printing an ink to make a printed part, removing the solvent from the printed part, and carbonizing the printed part (with the solvent removed) to make the aerogel. The ink is based on a solution of a resorcinol-formaldehyde resin (RF resin), water, and an organic thickener. Advantageously, the RF resin contains an acid catalyst, which tends to produce carbon aerogels with higher surface areas upon activation than those produced from methods involving an ink composition containing a base catalyzed resin.

5 Claims, 7 Drawing Sheets

(51) Int. Cl.
    *B29C 64/106*      (2017.01)
    *C09D 11/03*       (2014.01)
    *B33Y 10/00*           (2015.01)
    *B33Y 80/00*           (2015.01)
    *H01G 11/32*           (2013.01)
    *H01G 11/52*           (2013.01)
    *B29K 61/04*           (2006.01)
    *B29K 401/00*          (2006.01)
    *C01B 32/05*           (2017.01)
    *H01G 11/86*           (2013.01)

(52) U.S. Cl.
    CPC ...... *B29K 2061/04* (2013.01); *B29K 2401/00* (2013.01); *B33Y 10/00* (2014.12); *B33Y 80/00* (2014.12); *C01B 32/05* (2017.08); *H01G 11/32* (2013.01); *H01G 11/52* (2013.01); *H01G 11/86* (2013.01)

(58) Field of Classification Search
    CPC ...... C09D 11/02; C08K 3/36; B29K 2061/00; B29K 2401/00; B33Y 10/00; B33Y 70/00; C01B 32/182; C01B 32/198; B29C 64/00; B29C 64/112; B29C 64/10; B29C 64/106; B29C 64/118; B05D 1/36
    USPC .......................................... 252/502, 510, 511
    See application file for complete search history.

(56) References Cited

U.S. PATENT DOCUMENTS

| | | |
|---|---|---|
| 2011/0303880 A1 | 12/2011 | Mulik et al. |
| 2012/0097907 A1* | 4/2012 | Bauer ............... C04B 14/064 252/602 |
| 2017/0253751 A1* | 9/2017 | Busbee ............... B33Y 10/00 |

OTHER PUBLICATIONS

Leventis, Nicholas, et al.: "Acid-catalyzed Time-efficient Synthesis of Resorcinol-Formaldehyde Aerogels and Crosslinking with Isocyanates," Polymer Preprints, American Chemical Society, 47(2), Jan. 2006, pp. 364-365.

Mulik, Sudhir, et al.: "Time-Efficient Acid-Catalyzed Synthesis of Resorcinol-Formaldehyde Aerogels," Chem. Mater., 19 (25), 2007, Synopsis and Abstract, two pages.

Suss, Matthew E., et al.: "Capacitive desalination with flow-through electrodes," Energy & Environmental Science, 5, 2012, pp. 9511-9519.

Zhu, Cheng, et al.: "Highly compressible 3D periodic graphene aerogel microlattices," Nature Communications, 6: 6962, DOI: 10.1038/ncomms7962, Apr. 22, 2015, eight pages.

Zhu, Cheng, et al.: "Supercapacitors Based on Three-Dimensional Hierarchical Graphene Aerogels with Periodic Macropores," Nano Letters, 16, 2016, pp. 3448-3456.

Moussaoui, Rebah et al., "Sol-gel synthesis of microporous carbon using resorcinol and formaldehyde", Journal of Chemical Research, Apr. 27, 2016, vol. 40, No. 4, pp. 209-212.

Despetis, F. et al., "Effect of aging on mechanical properties of resorcinol-formaldehyde gels", Journal of Sol-Gel Science and Technology, 2000, vol. 19, Nos. 1-3, pp. 829-831.

Rey-Raap, Natalia et al., "Aqueous and organic inks of carbon xerogels as models for studying the role of porosity in lithium-ion battery electrodes", Materials and Design, Jul. 14, 2016, vol. 109, pp. 282-288.

Araby, Sherif et al., "Aerogels based on carbon nanomaterials", Journal of Materials Science, Jul. 11, 2016, vol. 51, No. 20, pp. 9157-9189.

International Search Report and Written Opinion of Isa related to corresponding International Application No. PCT/US2018/035835, dated Jan. 15, 2019, 9 pages.

Smay, J. E. et al., "Directed Colloidal Assembly of 3D Periodic Structures," Advanced Materials, Wiley-VCH Germany, DE, vol. 14, No. 18, Sep. 16, 2002 (pp. 1279-1283).

European Search Report dated May 11, 2020 for corresponding EP Application 18813588.3 (13 pages).

* cited by examiner

Carbon Activation

SYSTEM AND METHOD FOR FORMING ACTIVATED CARBON AEROGELS AND PERFORMING 3D PRINTING

STATEMENT OF GOVERNMENT RIGHTS

The United States Government has rights in this invention pursuant to Contract No. DE-AC52-07NA27344 between the U.S. Department of Energy and Lawrence Livermore National Security, LLC, for the operation of Lawrence Livermore National Laboratory.

FIELD

The present disclosure relates to systems and methods for three dimensional printing, and more particularly to systems and methods for fabricating carbon aerogels through a direct ink writing process.

BACKGROUND

This section provides background information related to the present disclosure which is not necessarily prior art.

Carbon aerogels are porous solids with interconnected carbon particles and so they exhibit high surface area and good electrical conductivity. Activated carbon aerogels are useful electrode materials for applications such as capacitive deionization, flow batteries, supercapacitors (or electric double-layer capacitors), and others. For example, interest in capacitive deionization systems, and making such systems more efficient, is growing in part because of growing interest in the use of deionization systems in desalination applications to remove salt from salt water. However, optimizing electrode design, for example the pore geometries of the electrode material to achieve improved efficiencies, still remains a challenge.

Additional information on the present state of the art involving three dimensional printing of aerogels may be found at the following: *High surface area carbon aerogel monoliths with hierarchical porosity*—Journal of Non-Crystalline Solids—354 (29), 2008, Proceedings of the National Academy of Sciences—111 (7), 2014, 3513-3515; *Capacitive desalination with flow-through electrode*—Energy and Environmental Science—5 (11), 2012, 9511-9519; *Highly compressible 3D periodic graphene aerogel micro-lattices*—Nature Communications—6 (6962), 2015; T. Baumann et al., reported a synthetically tailored high surface area (3000 m2/g) carbon aerogels with bimodal porosity which can be used as electrodes for electrochemical devices; M. Stadermann et al., described a model capacitive desalination (CD) cell which employed activated carbon aerogels as electrodes, with the efficiency of the cell being four times higher than a typical CD cell; Cheng et al., employed direct ink writing technique to prepare graphene aerogels with defined geometries.

3-D printing inks thickened with graphene oxide have also been made containing base catalyzed resorcinol-formaldehyde resins. Drawbacks from using such inks have been identified in the current work and represent further challenges in producing carbon aerogels downstream from the 3-D parts printed using the ink.

SUMMARY

This section provides a general summary of the disclosure, and is not a comprehensive disclosure of its full scope or all of its features.

Carbon aerogels and electrodes fabricated from them, as well as methods for making them, are disclosed. In various embodiments, they overcome draw backs present in prior aerogels. In some aspects, the carbon aerogels have higher surface area or other superior properties. At the same time, challenges are addressed that arise in a 3-D printing step that is a precursor in forming the inventive carbon aerogels.

Generally, the method of making the carbon aerogel involves the steps of 3-D printing an ink to make a printed part, removing the solvent from the printed part, and carbonizing the printed part (with the solvent removed) to make the aerogel. The ink is based on a solution of a resorcinol-formaldehyde resin (RF resin), water, and an organic thickener. Advantageously, the RF resin contains an acid catalyst, which tends to result in the synthesis of carbon aerogels with higher surface areas than those produced from methods involving an initial step of 3-D printing an ink composition containing a base catalyzed resin.

The current teachings also provide a way of overcoming a challenge arising from the use of an acid catalyst for the resorcinol-formaldehyde reaction. While using an acid catalyst tends to improve the surface area of the downstream carbon aerogels, using the acid catalyst along with a conventional ink thickener like graphene oxide (GO) leads to ink compositions that increase quickly in viscosity, sometimes to a level that makes it difficult to carry out the 3-D printing step that is a precursor to making the carbon aerogel. To address this, the graphene oxide thickener is replaced in whole or in part by other water soluble thickeners such as soluble cellulose derivatives or soluble polyoxyalkylene compounds. In various embodiments, the development of viscosity in the ink over time is delayed to such an extent that the ink develops a viscosity an order of magnitude lower than that of inks containing graphene oxide.

Thus in various embodiments the ink compositions contain an acid catalyzed RF resin and enough of a non-GO thickener to overcome any observed increase in viscosity during the time the ink is being 3-D printed. In various aspects, the methods of making the carbon aerogels disclosed herein involve conventional steps of gelation, solvent exchange, supercritical $CO_2$ drying, carbonizing, and activating carried out in sequence beginning on the 3-D part printed with the new ink composition.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
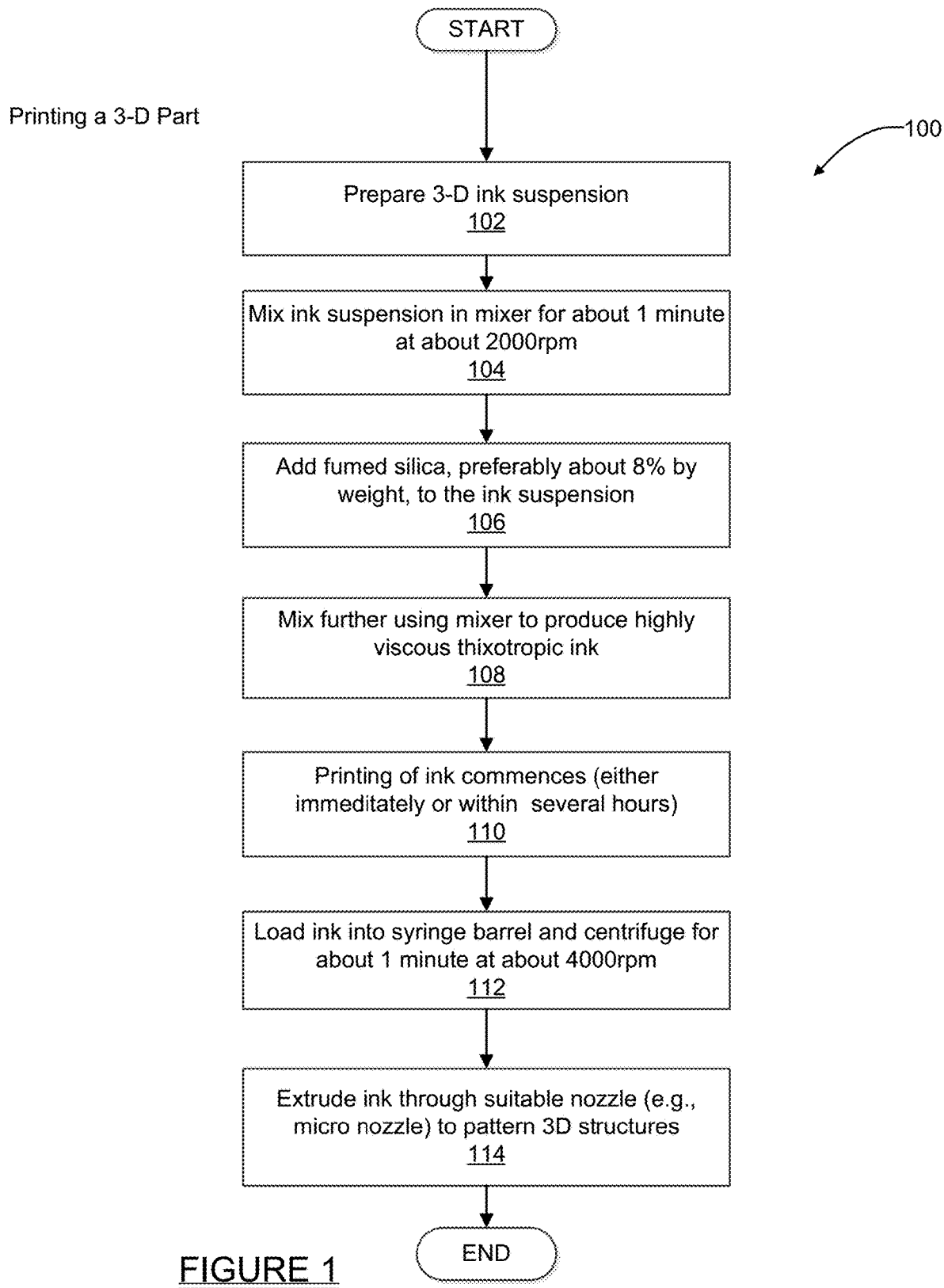
FIG. 1 is a flowchart illustrating operations that may be performed to form an ink comprised of a suspension of thickener, resorcinol, and formaldehyde.

Example embodiments will now be described more fully with reference to the accompanying drawings.

In one embodiment, a method of forming a carbon aerogel involves 3-D printing an ink to make a printed part, wherein the ink comprises solvent, a resorcinol-formaldehyde resin, and an organic thickener; removing the solvent from the printed part; and carbonizing the printed part to make the aerogel. The resorcinol-formaldehyde resin contains an acid catalyst and, in an embodiment, is characterized by having formaldehyde:phenol molar ratio greater than 1:1. The organic thickener is soluble in water and has a suitable molecular weight such that dissolving it in water raises the viscosity of the water solution. In various embodiments, the thickener is made of only C, H, and O atoms, and contains only ether or alcohol functional groups. In one embodiment, the thickener is also free of oxirane groups.

In some embodiments, the ink further comprises a thixotropic agent. An example is hydrophilic fumed silica. When the thixotropic agent is present, the method generally will involve a step of removing the thixotropic agent from the downstream aerogel, such as with HF etching to remove silica from the printed part.

In exemplary embodiments, the organic thickener comprises a soluble cellulose derivative or a soluble polyoxyalkylene compound. The acid catalyst comprises acetic acid, in non-limiting fashion. In some embodiments, the ink is free of graphene oxide. In others, the ink contains graphene oxide in addition to the organic thickener, but not so much as to cause an unacceptable viscosity increase during the 3-D printing.

In addition to the methods that start with providing an ink composition as detailed further herein, the teachings provide the improved carbon aerogels made by those methods. Advantageously, they are in a configuration useful as porous electrodes in supercapacitors, capacitive desalination, flow batteries, and the like.

In another embodiment, a 3-D printing ink contains solvent comprising water; an organic thickener; resorcinol and formaldehyde; and an acid catalyst that catalyzes a reaction between the resorcinol and formaldehyde. As before, the thickener is soluble in water, is made of only C, H, and O atoms, and contains only ether groups—exclusive of oxirane groups—or alcohol functional groups.

In various embodiments, the ink further comprises a thixotropic additive, which can be fumed silica, and which can be removed with HF etching. The acid catalyst comprises acetic acid in a preferred embodiment, and the molar ratio of resorcinol to formaldehyde in the ink is less than 1:1, in an illustrative embodiment. As noted the ink can contain or not contain graphene oxide, as long as the organic thickener is present. In various embodiments, the organic thickener comprises hydroxypropylmethylcellulose or a polyoxyalkylene compound. The ink can contain about 10% to 60% by weight of the resin.

In another embodiment, a supercapacitor comprises a positive electrode, a negative electrode, and a separator disposed between the electrodes, and at least one of the positive electrode, negative electrode, and separator comprises a carbon aerogel made by the methods described herein, starting with the ink formulations containing the organic thickener. Thanks to the new synthetic method, the carbon aerogel electrode can attain a specific capacitance above 80 F/g, above 120 F/g or above 200 F/g. In one embodiment, the electrode has a specific capacitance of about 240 F/g.

Likewise a flow battery is provided where one of its electrodes comprises a porous carbon aerogel made as described herein beginning with 3-D ink compositions containing the organic thickeners.

A flow through capacitive deionization cell comprises two porous electrodes—a positive electrode and a negative electrode—connected so as to provide a cell voltage of $V_{cell}$. At least one of the electrodes is a porous carbon aerogel made by the methods described herein. In operation, brackish water flows through the cell; negative ions are captured in the positive electrode and positive ions are captured in the negative electrode. Removing the ions turns the brackish water into desalinated water. The cell is regenerated by reversing the polarity, whereupon the ions are expelled from the respective electrodes.

The present disclosure involves systems and methods for the manufacture and use of 3D printed structures with channels in one direction for bulk flow. Having the channels formed in one direction may enable the lowering of flow resistance (and thus lower pumping costs) while still having high surface area and high electrical conductivity. The high surface area and high electrical conductivity contributes to efficient salt removal in a deionization system being used for desalination purposes. Still further applications exist, such as flow batteries, where bulk flow needs to be orthogonal to diffusion, and where this technology is expected to be highly applicable and highly useful.

Preparation of Inks Containing Graphene Oxide

Graphene oxide (GO), in one example purchased from Cheap Tubes Inc. of Grafton, Vt., and having a lateral dimension of 300-800 nm were used to prepare the aerogels. The GO suspension was prepared by ultrasonicating 0.08 g of GO in 1.473 g of formaldehyde (F) (37% solution) and 1.07 g of water for 24 h. After sonication, 1.0 g of resorcinol (R) and 724 of acetic acid (catalyst (C)) were added to the suspension. This combination of R/F molar ratio of 1:2 and R/C molar ratio yielded a RF mass ratio of 42 wt % and a GO concentration of 40 mg/ml. Preliminary rheology experiments showed that a thixotropic gel consistency is achieved within about 2,500 seconds for inks with GO concentration of 40 mg/ml, whereas, it takes about 10,000 seconds for inks with a GO concentration of 10 mg/ml.

Making Carbon Aerogels

Carbon aerogels are useful as electrodes in a variety of applications that depend on a high level of porosity. Starting with the new ink compositions, the aerogels are made using a number of knowing process steps. The ink is 3-D printed into the shape or configuration taken on by the electrodes. Gelation is completed in the printed part to make a hydrogel. Then the aqueous solvent is first exchanged with an organic solvent like acetone, and then the part is subject to supercritical drying to remove the solvent and create an intermediate polymer aerogel. The polymer aerogel is then subjected to carbonization at elevated temperature in an oxygen free environment such as in a nitrogen atmosphere. If a thixotropic agent was used in the ink, it is now removed, such as with the use of HF etching, followed by solvent exchange and supercritical drying to prepare a carbon aerogel. The carbon aerogel is then activated by exposing it to elevated temperature in an oxidizing environment. This increases the porosity of the carbon aerogel. The activated carbon aerogel is then ready for use as electrodes as described.

3-D Printing Ink Compositions

The methods of making carbon aerogels starts with a 3-D ink composition containing solvent, the elements of an acid catalyzed resorcinol-formaldehyde (RF) resin, and a particular kind of organic thickener. Optional ingredients include other thickeners such as graphene oxide, as well as thixotropic additives like fumed silica to provide the ink with the right rheology for the 3-D ink writing process. The inks also optionally contain additives that can increase the conductivity of the inks, such as graphene nanoplatelets.

The solvent is based on a major portion of water, but can contain other non-aqueous solvents soluble in water. The additives are selected for their solubility in the solvent system. After printing, the water will be exchanged out and the printed part dried with supercritical $CO_2$.

The elements of the RF resin include formaldehyde, resorcinol, and an acidic component that serves as catalyst for the reaction of resorcinol and formaldehyde. Upon combining the resorcinol and formaldehyde in the presence of the catalyst, reaction begins, which will ultimately lead to a gel in the printed part. So when the catalyst is initially added, the components exist primarily as the unreacted monomers formaldehyde and resorcinol. Over time as reaction proceeds, more and more of the initially unreacted components become tied up in a polymer gel that will ultimately fill the ink composition or any 3-D part printed using the composition. However, in all cases, the ink is described as containing an RF resin, and in particular, an acid catalyzed RF resin.

The organic thickener is selected from water soluble polymers that contain only C, H, and O atoms, and that contain only ether or alcohol functional groups, and where further the ether groups do not encompass any oxirane functionality. Although the invention is not limited by theory, it is supposed that the thickener lacks certain structural features present in previously used graphene oxide that tended to catalyze the development of viscosity in the ink at a rate that sometimes made it difficult to print with the ink containing graphene oxide. In any event, by providing an ink composition containing the organic thickener as partial or complete replacement for the graphene oxide otherwise used, the 3-D printing is observed to take place under better control, including in favorable conditions an order of magnitude less viscosity developed in the time it takes to print a 3-D part.

Suitable thickeners include water soluble cellulose derivatives, such as without limitation hydroxyethyl cellulose, hydroxypropyl cellulose (HPC), hydroxyethyl methyl cellulose, hydroxypropyl methyl cellulose (HPMC), and ethyl hydroxyethyl cellulose.

Another class of thickeners is the class of compounds known as polyoxyalkylene compounds. Formally, these water soluble thickeners are homopolymers and copolymers of ethylene oxide and propylene oxide. The copolymers can be block or heteric, and contain sufficient ethylene oxide content to maintain water solubility. In some aspects, the water soluble polyoxyalkylene compounds are prepared by adding ethylene oxide or propylene (and even higher analogs such as butylene oxide, as long as water solubility is maintained) to various initiators, such as ethylene glycol, propylene glycol, glycerin, trimethylolpropane, pentaerythritol, and so on. Others include alcohol alkoxylates such as those prepared from $C_1$ to $C_{24}$ alcohols. In various embodiments, the thickeners include associative thickeners prepared by capping an ethylene oxide or propylene oxide chain with a C8 or higher oxirane.

Polyvinyl alcohol is another example of a thickener useful in the ink compositions.

The inks can also contain other thickeners not limited by the structural constraints of the organic thickener. These include graphene and graphene oxide. The idea is to use enough of the new organic thickener to make an ink that overcomes the too-rapid viscosity development characteristic of inks thickened solely by graphene oxide.

Optionally, the ink compositions can contain a so-called thixotropic agent to provide the ink with just the right viscosity for being extruded during the 3-D printing step. Fumed silica is one example. If it is used, it is normally preferred to remove it from the carbon aerogel using a hydrofluoric acid (HF) etch step, illustrated in the figures and working examples.

The ink compositions can contain other components as long as they do interfere with the ink writing process or the synthesis of the carbon aerogels herein described.

3-D Printing of the Ink Compositions

Referring to FIG. 1, a flowchart 100 is illustrated to help describe the 3D printing of the ink compositions (for convenience, these will be referred to as "inks." At operation 102 the ink is initially put together using example amounts of resorcinol, formaldehyde, thickener, and catalyst. At operation 104 the ink is then mixed in a suitable mixer, for example a planetary centrifugal mixer such as those available from Thinky USA Inc. The mixing is carried out for about a minute at suitable speed, for example about 2000 rpm. At operation 106 fumed silica is added, preferably about 8% by weight, to the ink and then mixed again, as indicated at operation 108, using the mixer (e.g., planetary centrifugal mixer from Thinky USA Inc.) The mixing at operation 108 produces a highly viscous thixotropic ink. When the inks contain graphene oxide, and depending on the gelation time of the suspension, printing of the ink commences immediately for the 40 mg/ml concentration of GO or about 4 hours later for the 10 mg/ml concentration of GO, as indicated at operation 110.

The ink is then loaded into a syringe barrel and centrifuged for about a minute at 4000 rpm to remove air bubbles, as indicated at operation 112. The ink is then extruded through a micro nozzle (e.g., 600 μm or 250 μm diameter micro nozzle) to pattern 3D structures, as indicated at operation 114.

Using the above described process, patterns can printed on a substrate such as a glass substrate, coated for example with PTFE spray. Simple cubic lattices with multiple alternating orthogonal layers of parallel cylindrical rods are printed, in a non-limiting embodiment. The diameter of the cylindrical rods is set by the diameter of the nozzle, and the center-to-center rod spacing of 1.2 mm (for a 600 μm nozzle) and 0.8 mm (for a 250 μm nozzle) are respectively achieved. In a particular embodiment, a plurality of layers up to a total of 10 layers is stacked on the structure such that each layer has a Z-direction spacing of 0.3 mm. In order to avoid cracking during printing due to evaporation of water, drops of iso-octane (2,2,4-trimethylpentane) are added as needed.

Gelation and Processing of the Printed Part

Figure 2:
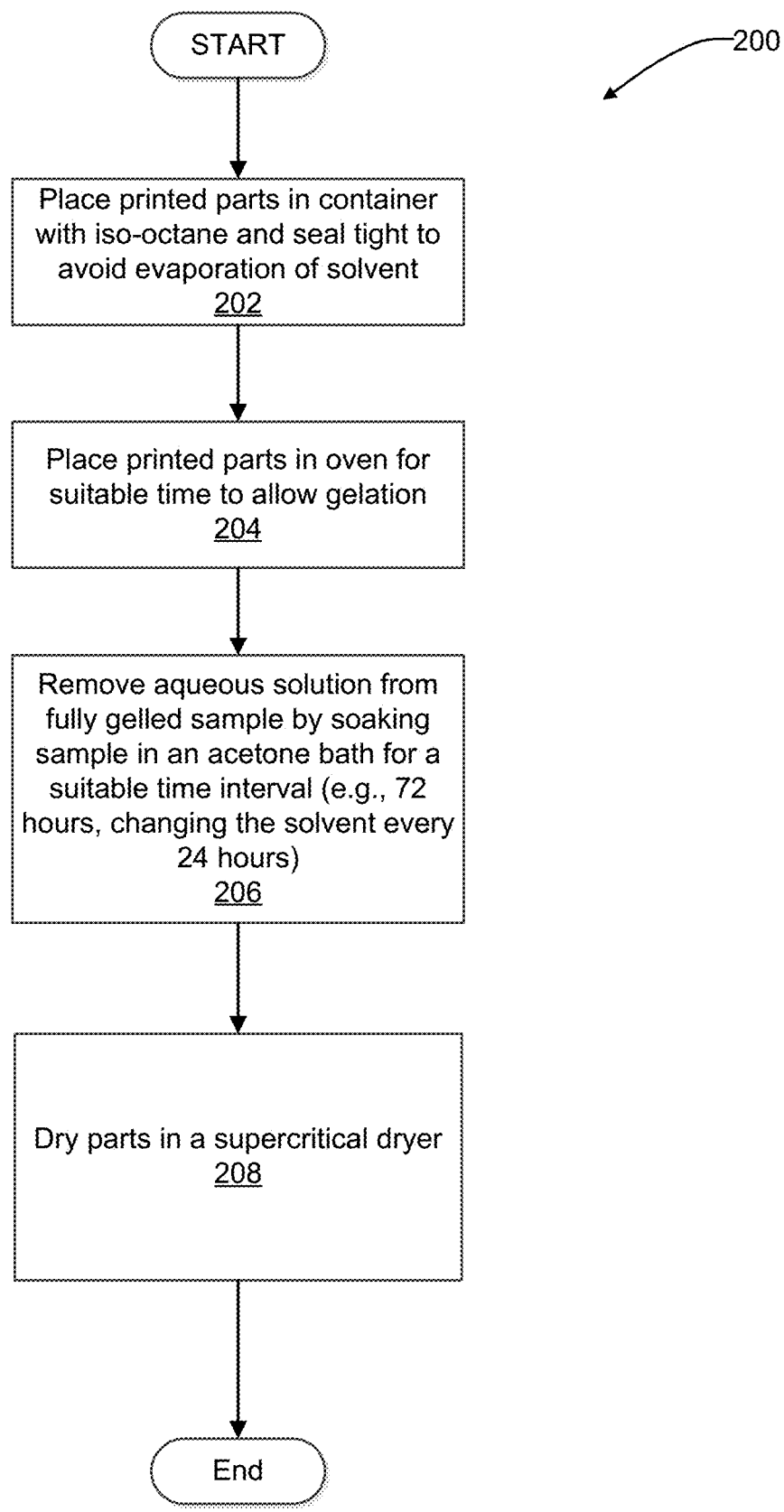
FIG. 2 is a flowchart illustrating operations that may be performed in printing a 3D structure using the ink.

Referring to FIG. 2 and flowchart 200, the printed parts on the glass substrate are placed in a container with iso-octane and sealed tightly to avoid evaporation of the solvent, as indicated at operation 202. The printed parts, while positioned on the glass substrate, may then be then placed in an oven at about 80° C. for a suitable time period to allow for gelation, as indicated at operation 204. In one example a time interval of about 72 hours is sufficient to achieve gelation. Once the printed part is gelled, the aqueous solvent (water in this example) is removed by soaking the sample in an acetone bath for a suitable time interval, as indicated at operation 206. In one example this time interval is three days. It is advantageous for the solvent to be exchanged about every 24 hours. This step is helpful as the following procedure of supercritical drying is carried out with $CO_2$. The samples are then supercritically dried in $CO_2$ at a critical temperature of preferably about 55° C., and at a pressure range of preferably about 1200-1400 psi, as indicated at operation 208.

Carbonization and Activation of 3D Printed Part

Figure 3:
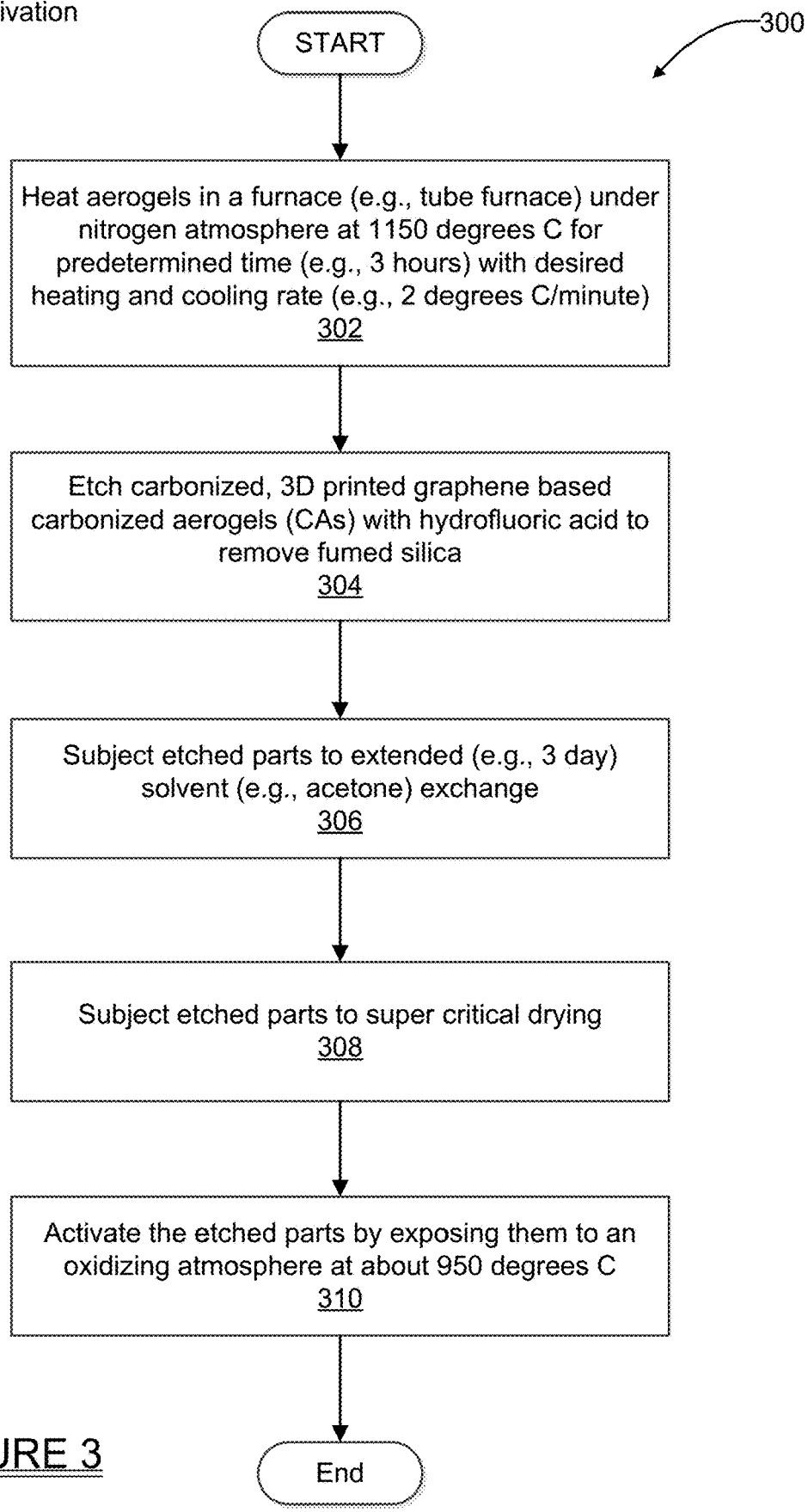
FIG. 3 is a flowchart illustrating operations that may be performed in carbonizing and activating the 3D printed structure formed in FIG. 2.

The processed printed part is now at a stage of being a polymeric aerogel. Referring to flowchart 300 of FIG. 3, the carbonization and activation of the aerogel involves carbonizing the supercritically dried 3D printed organic (or polymeric) gel to form carbon aerogels. As indicated at operation 302, the aerogels are subjected to a carbonizing step, which is a heat treatment process where the samples are heated in a tube furnace under nitrogen atmosphere at preferably about 1050° C. for 3 h with a heating and cooling rate of preferably about 2° C./min. The carbonized 3D printed carbon aerogels are then etched with hydrofluoric acid to remove fumed silica, as indicated at operation 304. The etched parts are then again subjected to an extended solvent exchange, for example a three-day solvent (acetone) exchange, as indicated at operation 306, followed by a supercritical drying period, as indicated at operation 308. For activation, the samples are then exposed to an oxidizing atmosphere at preferably about 950° C., as indicated at operation 310.

Figure 4:
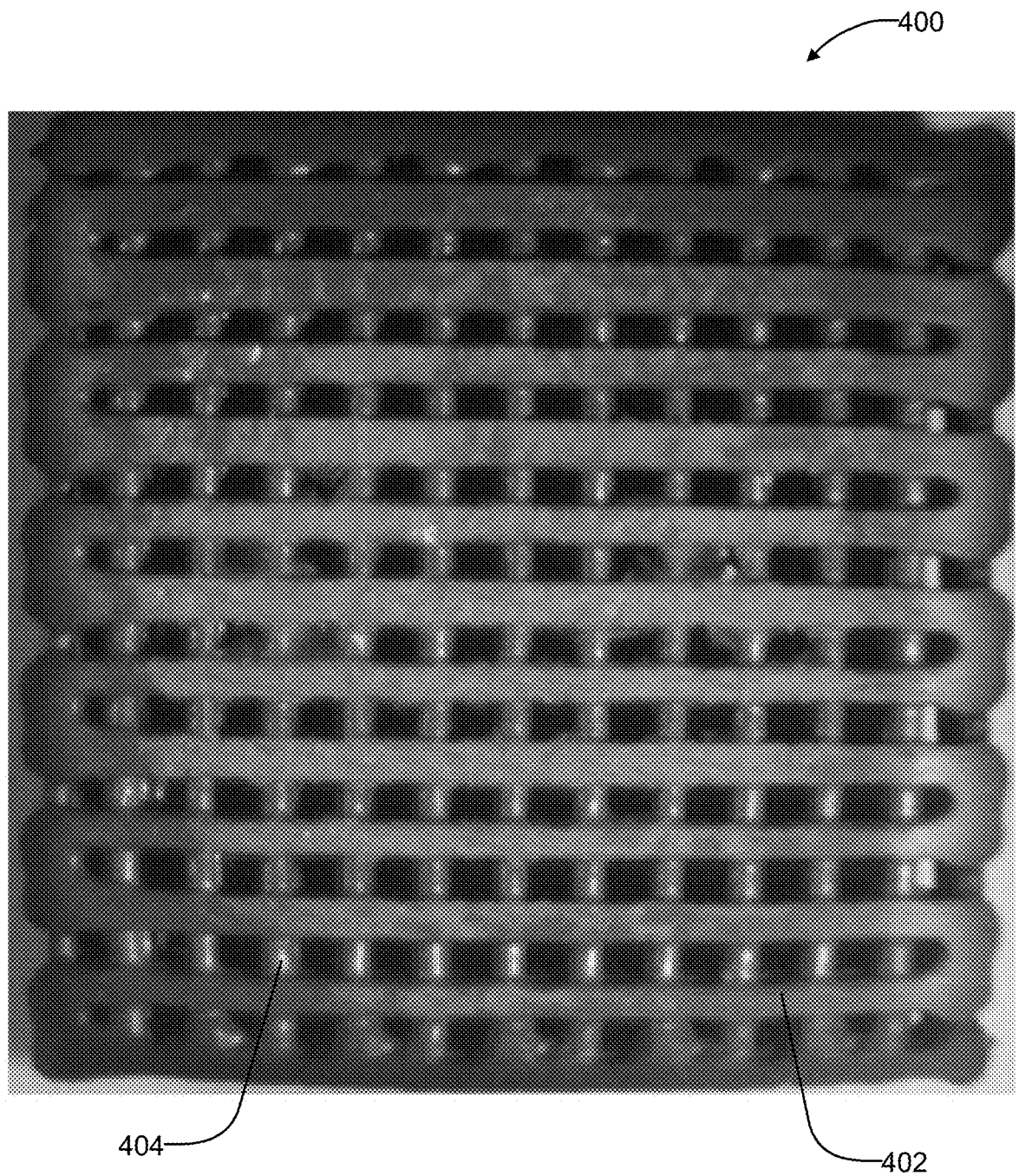
FIG. 4 is a picture of a 3D printed structure formed using the carbon aerogel of the present disclosure.

One example of a 3D printed part 400 formed in accordance with the above described operations is shown in FIG. 4. It will be appreciated that while the part 400 forms a lattice structure with perpendicularly extending runs 402 and 404 arranged in alternating fashion in the Z direction, that the teachings provide herein are not limited to such a structure. The teachings provided herein may be used to a wide variety of different 3D structures having different cross sectional configurations.

The carbon aerogels fabricated in accordance with the above-described teachings form porous solids with interconnected carbon particles and thus exhibit high surface area and electrical conductivity along with high structural stability. The processes for formulating carbon aerogels through a direct ink writing process, as described herein, provides control over pore size as well as the geometries of organic and carbon aerogels. When the 3D printed carbon aerogels are activated they yield high surface area carbon aerogels.

EXAMPLES

Example 1—Acid Catalyzed RF Ink Thickened with Graphene Oxide

Graphene oxide (GO) purchased form Cheap Tubes Inc. having a lateral dimension of 300-800 nm were used to prepare the aerogels. The GO suspension was prepared by ultrasonicating 0.08 g of GO in 1.473 g of formaldehyde (F) (37% solution) and 1.07 g of water for 24 h. After sonication, 1.0 g of resorcinol (R) and 72 µL of acetic acid (catalyst (C)) were added to the suspension. This combination of R/F molar ratio of 1:2 and R/C molar ratio yielded a RF mass ration of 42 wt % and a GO concentration of 40 mg/ml.

Preliminary rheology experiments showed that a thixotropic gel consistency is achieved within 2500 seconds for inks with GO concentration of 40 mg/ml, whereas, it takes 10000 second for inks with GO concentration of 10 mg/ml.

The GO/formaldehyde/water suspension was mixed with required amounts of resorcinol and catalyst (mentioned in earlier section) was mixed in a Thinky mixer for a minute at 2000 rpm. Fumed silica (8% by weight) was added to the GO_ARF suspension and mixed again using Thinky so that highly viscous thixotropic ink is obtained. Depending on the gelation time of the suspension, printing of the ink commences immediately (for 40 mg/ml concentration of GO) or 4 hours later (for 10 mg/ml concentration of GO).

The ink is then loaded into a syringe barrel and centrifuged for a minute at 4000 rpm to remove air bubbles, after which the ink is extruded through a micro nozzle (600 µm or 250 µm diameter) to pattern 3D structures. The patterns were printed on a glass substrate coated with PTFE spray. Simple cubic lattices with multiple orthogonal layers of parallel cylindrical rods were printed alternately. The diameter of the cylindrical rods equals the diameter of nozzle and the center-to-center rod spacing of 1.2 mm (for 600 µm nozzle) and 0.8 mm (250 µm nozzle) were respectively used. A total of 10 layers were stacked on the structure such that each layer has a z spacing of 0.36 mm for a 600 micron nozzle and 0.15 mm for a 250 micron nozzle. In order to avoid cracking due to evaporation of water, or clogging of the nozzle due to drying of ink, drops of iso-octane (2,2,4-trimethyl-pentane) was added onto the printed structure frequently. The printed parts on the glass substrate is carefully placed in a container with iso-octane and sealed tightly to avoid evaporation of the solvent and are placed in the oven at 80° C. for 72 h for gelation.

Once gelled, the aqueous solvent (water in this case) is removed by soaking the sample in an acetone bath for 3 days. Note that the solvent needs to be exchanged every 24 h. This step is crucial as the following procedure of super critical drying is carried out with CO2. The samples are then super critically dried in liquid CO2 at a critical temperature of 55° C. and at a pressure range of 1200-1400 psi.

Carbonization and Activation of 3D Printed Part

This process involves carbonizing the supercritically dried 3D printed GO_ARF graphene organic gel to form carbon aerogels. The aerogels were subjected to a heat treatment process where the samples were heated in a tube furnace under nitrogen atmosphere at 1050° C. for 3 h with a heating and cooling rate of 2° C./min. The carbonized 3D printed graphene based CAs were then etched with hydrofluoric acid to remove fumed silica. The etched parts were again subjected to a three-day solvent (acetone) exchange followed by super critical drying. For activation, the samples are now exposed to an oxidizing atmosphere at 950° C.

Example 2—Ink Thickened with an Organic Thickener

A suspension of 3 g of water, 3.4 g of formaldehyde (F) (37% solution) and 6 wt % of cellulose was prepared by ultra-sonication for 24 h. After sonication and prior printing, 2.46 g of resorcinol (R) and 88 µL of acetic acid (catalyst (C)) were added to the suspension. This combination of R/F molar ratio of 1:2 and R/C molar ratio of 1:15, yielded a RF mass ratio of 42 wt %. After the addition of resorcinol, the 6 wt % of cellulose drops to 4 wt % in the overall suspension. The overall suspension is mixed for 5 min at 2000 rpm in a Thinky mixture until a through mixing of resorcinol with formaldehyde/water/cellulose suspension was obtained. However, for direct ink writing a thixotropic ink is necessary with elastic stiffness such that the extruded beads from the nozzle can span easily. To achieve the required stiffness in the inks, 9 wt % of hydrophilic fumed silica was mixed to the suspension and was then loaded to a syringe barrel for printing.

The ink which is loaded into a syringe barrel was centrifuged for a minute at 4000 rpm to remove air bubbles, after which the ink is extruded through a micro nozzle (600 μm or 250 μm diameter) to pattern 3D structures. The patterns were printed on a glass substrate. Simple cubic and face-centered lattices with multiple orthogonal layers of parallel cylindrical rods were printed alternately. The diameter of the cylindrical rods equals the diameter of nozzle and the center-to-center rod spacing of 1.2 mm (for 600 μm nozzle) and 0.8 mm (250 μm nozzle) were respectively used. A total of 10 layers were stacked on the structure such that each layer has a z spacing of 0.36 mm for 600 micron and 0.15 mm for 250 micron nozzle diameter. In other embodiments, up to 30 layers are stacked. In order to avoid cracking due to evaporation of water or clogging of the nozzle from ink drying, drops of iso-octane (2,2,4-trimethyl-pentane) were added onto the printed structure frequently.

The following steps are carried out on the printed parts:

Curing

The printed parts are cured in the oven for three days at 80° C.

Solvent Exchange

After curing, the samples are exchanged with acetone to remove water for three days.

Supercritical Drying

The samples are dried in a critical point dryer or Polaron in liquid CO2.

Carbonization

The dried samples are carbonized in a tube furnace at 1050° C. under nitrogen atmosphere for three hours at a heating rate of 2 C/min.

Silica Removal

Once carbonized, the samples were given for HF etching to remove the silica particles, and the samples after silica removal are in ethanol solution.

Solvent Exchange and Supercritical Drying

The samples are again subjected to solvent exchange from ethanol to acetone and are again supercritically dried.

Activation

Activation is done to further increase the surface area by creating a porous network. The samples are heated to 950° C. in a tube furnace in $CO_2$ atmosphere. By tuning the time of exposure of the samples to $CO_2$, the surface area of the samples can be adjusted.

In the present case, the time of $CO_2$ exposure was altered until a mass loss of 60 percent was achieved after activation.

Example 3—Viscosity Development

Storage modulus is measured as a function of time for the ink compositions of Examples 1 and 2. The storage modulus (viscosity) of formulated inks increases during the time it takes to make a 3-D printed part from the inks. The increase in modulus represents the change from low viscosity liquid to gel and then to a stiff solid. The gel time of the formulated inks is estimated using a rheometer to measure the storage shear modulus of the inks. When steady state is reached after about 5 or 6 hours, the storage modulus of the ink of Example 1 (the one made with graphene oxide thickener) is an order of magnitude higher than the steady state storage modulus of the ink of Example 2. In fact, once the ink of Example 1 reaches a steady state, the storage modulus is so high that it reaches a solid state from gelation and is difficult to extrude. For reference, the lower storage shear modulus of the ink of Example 2 at steady state is on the order of about 100,000 GPa. The lower storage modulus of the Example 2 ink containing the organic thickener makes it possible to use the ink to be extruded for 3-D printing for an extended period of time.

Example 4

Figure 5:
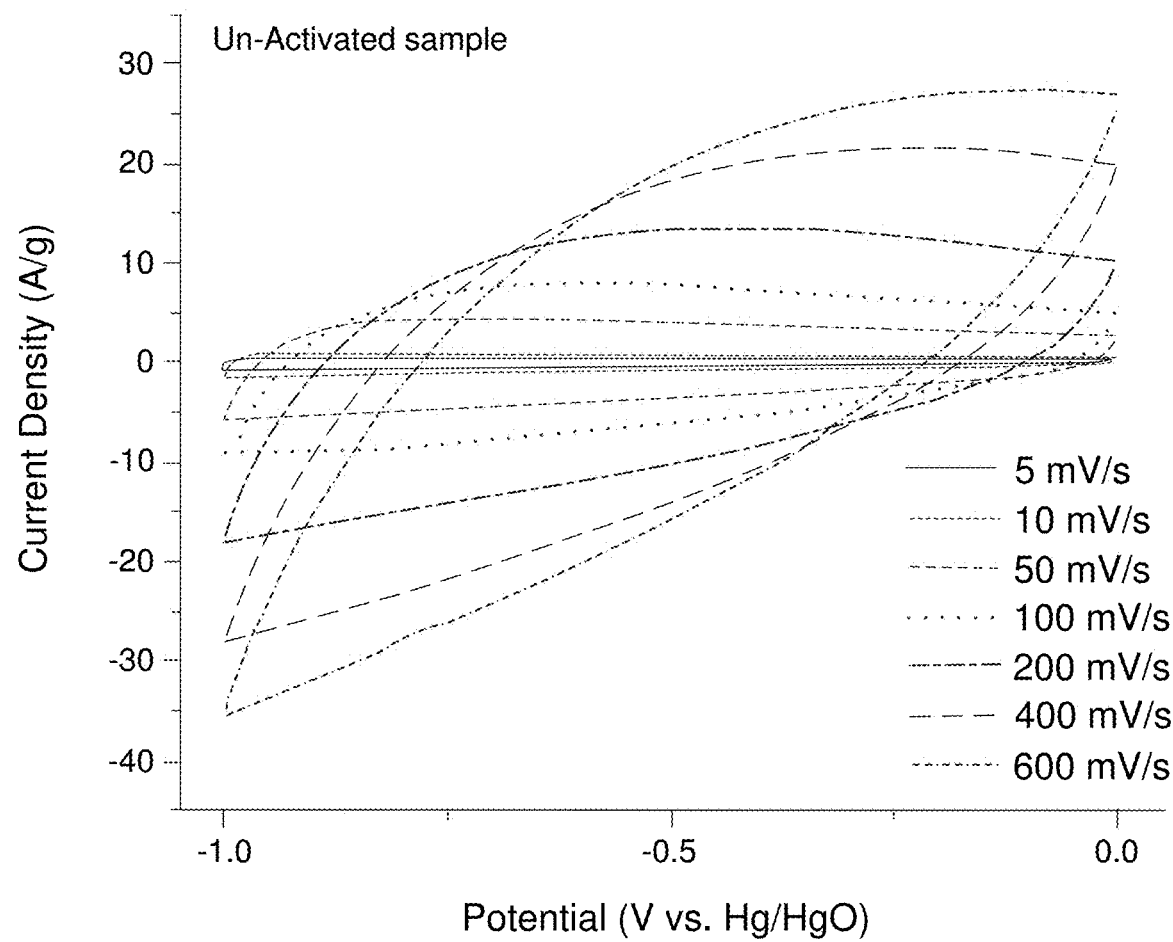
FIG. 5 shows a CV curve of an unactivated 3D printed sample at different scan rates.
Figure 6:
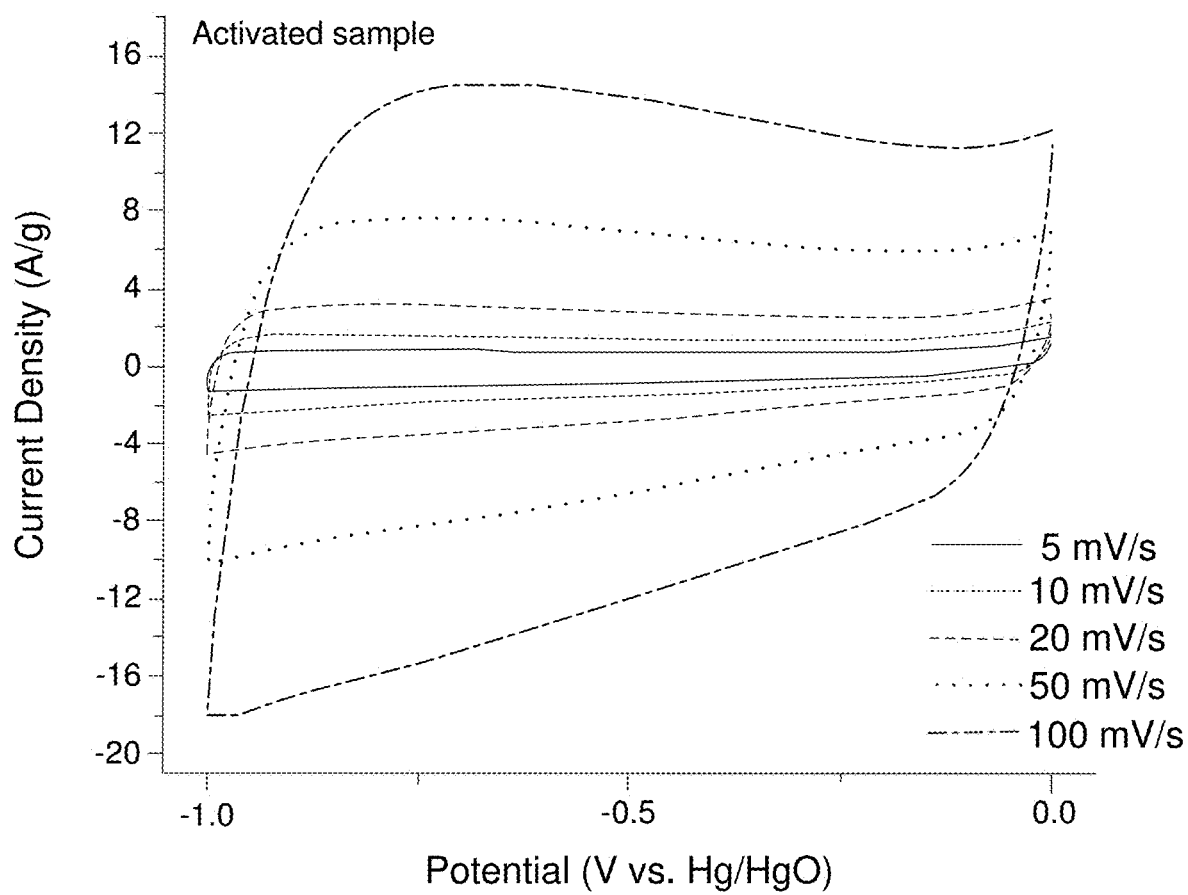
FIG. 6 shows a CV curve of an activated 3D printed sample at different scan rates.

The electrochemical performances of electrodes prepared according to Example 2 are shown in FIGS. 5 and 6. The 3D printed samples are measured through CV curves at different scan rates.

The un-activated samples shown in FIG. 5 (i.e., the carbon aerogel of Example 2 before the activation step) contain a semi-rectangular CV curve, which accounts for the higher internal resistance in these electrodes and lower surface area of the electrodes for lower capacitance values.

The CV curves in FIG. 6 of the 3D printed electrodes after activation have a more rectangular shape indicating lower resistance of the samples and high surface area through activation and hence exhibits higher capacitance.

Example 5

Figure 7:
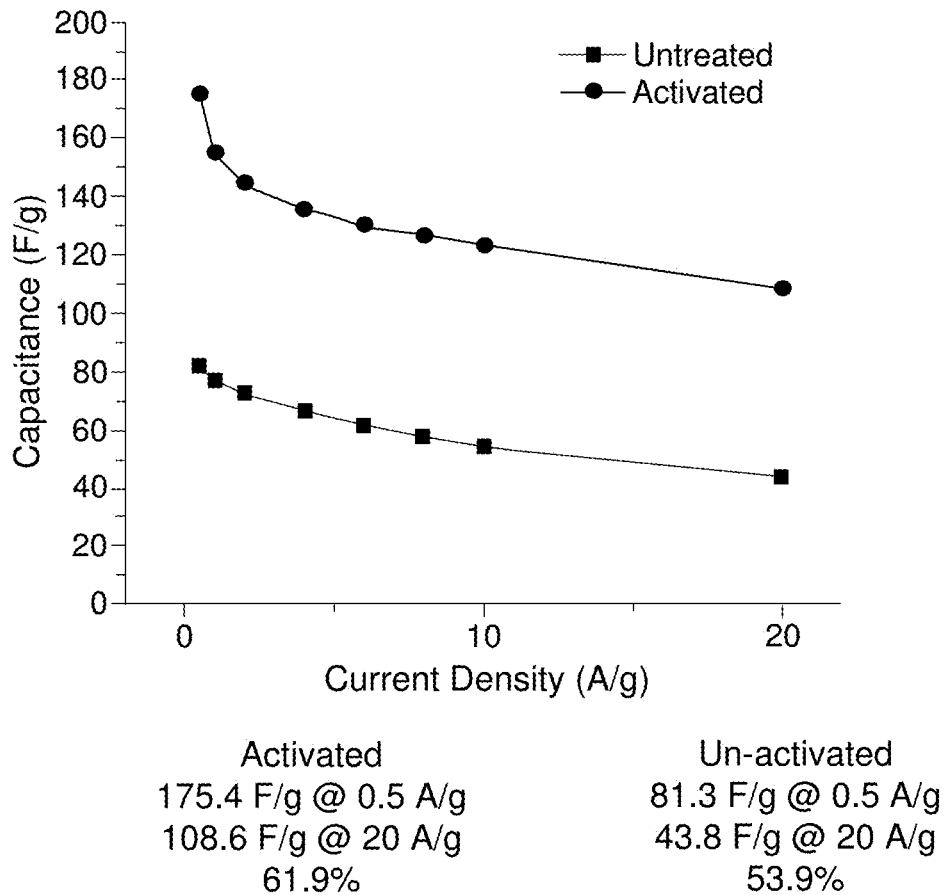
FIG. 7 is a plot of the specific capacitance of activated and unactivated electrodes at various current densities.

The specific capacitance of the activated and un-activated 3D printed electrodes (based on the ink of Example 2) at various current densities is plotted in FIG. 7. At low current densities, highest specific capacitances of 81.3 and 175 F/g are observed for un-activated and activated electrodes as expected owing to the high surface area of activated electrodes.

At higher current densities, only 54% of the capacitance is retained for un-activated samples and 62% for activated samples. At higher current densities, efficient electron transfer is required for quick current buildup. The higher rate capability of the activated electrodes is probably due to higher electrical conductivity and surface area of the electrodes through activation which enables fast ion diffusion through the thickness of the electrodes The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

What is claimed is:

1. A 3-D printing ink, comprising:
   water;
   an organic thickener selected from the group consisting of water soluble cellulose derivatives, polyoxyalkylene compounds, polyvinyl alcohol, and mixtures thereof;
   a resin that comprises resorcinol and formaldehyde;
   an acid catalyst that catalyzes a reaction between the resorcinol and formaldehyde; and
   a thixotropic additive;
   wherein the 3-D printing ink does not contain graphene oxide; and
   wherein the 3-D printing ink is a viscous thixotropic ink that is operable to gel after printing to form a printed part.

2. The 3-D printing ink of claim 1, wherein the thixotropic additive comprises fumed silica.

3. The 3-D printing ink of claim 1, wherein the organic thickener comprises hydroxypropylmethylcellulose.

4. The 3-D printing ink of claim 1, wherein the organic thickener comprises a polyoxyalkylene compound.

5. The 3-D printing ink of claim 1, comprising 10% to 60% by weight of the resin.

* * * * *